United States Patent
Kaiser et al.

(10) Patent No.: US 7,677,116 B2
(45) Date of Patent: Mar. 16, 2010

(54) FORCE SENSOR DEVICE IN A TWO-WHEELED VEHICLE

(75) Inventors: Harry Kaiser, Markgroeningen (DE); Matthias Moerbe, Ilsfeld-Helfenberg (DE)

(73) Assignee: Robert Bosch GmbH, Stuttgart (DE)

( * ) Notice: Subject to any disclaimer, the term of this patent is extended or adjusted under 35 U.S.C. 154(b) by 639 days.

(21) Appl. No.: 11/612,783

(22) Filed: Dec. 19, 2006

(65) Prior Publication Data

US 2007/0137916 A1   Jun. 21, 2007

(30) Foreign Application Priority Data

Dec. 20, 2005   (DE) ................. 10 2005 060 861

(51) Int. Cl.
*G01L 1/00* (2006.01)
*G01L 1/12* (2006.01)

(52) U.S. Cl. ............................. 73/862.381; 73/862.69; 280/275; 180/271

(58) Field of Classification Search ................. 180/271; 73/862.01, 862.69, 862.381, 862.391, 862.631; 280/267, 268, 269, 275
See application file for complete search history.

(56) References Cited

U.S. PATENT DOCUMENTS

| | | | | |
|---|---|---|---|---|
| 5,586,780 A | * | 12/1996 | Klein et al. | ................. 280/275 |
| 5,594,411 A | * | 1/1997 | Ono | ......................... 340/425.5 |
| 6,345,544 B1 | * | 2/2002 | Mizuno et al. | ........... 73/862.69 |
| 6,672,437 B2 | | 1/2004 | Beringer | |
| 6,813,966 B2 | | 11/2004 | Dukart | |
| 6,964,203 B2 | * | 11/2005 | Crasset | ........................ 73/854 |
| 6,986,293 B2 | | 1/2006 | Dukart | |
| 2002/0180166 A1 | * | 12/2002 | Voss | ........................... 280/5.5 |
| 2004/0035630 A1 | | 2/2004 | Lich et al. | |
| 2004/0050182 A1 | | 3/2004 | Dukart | |
| 2007/0246903 A1 | * | 10/2007 | Melcher | .............. 280/124.103 |

FOREIGN PATENT DOCUMENTS

| | | |
|---|---|---|
| DE | 102 16 723 | 10/2003 |
| DE | 102 23 366 | 12/2003 |
| DE | 102 29 021 | 1/2004 |
| DE | 102 39 140 | 3/2004 |
| DE | 102 42 251 | 3/2004 |

\* cited by examiner

*Primary Examiner*—Lisa M Caputo
*Assistant Examiner*—Punam Patel
(74) *Attorney, Agent, or Firm*—Michael J. Striker

(57) ABSTRACT

A force sensor apparatus in a two-wheeled vehicle in which a main frame that connects a front wheel to a rear wheel is attached to at least one additional frame component for accommodating persons and belongings, has a bearing body with an integrated force sensor attachable at least in a region of a connecting point between the main frame and the at least one additional frame component and sensing forces that occur between the main frame and the at least one additional frame component.

9 Claims, 3 Drawing Sheets

FORCE SENSOR DEVICE IN A TWO-WHEELED VEHICLE

CROSS-REFERENCE TO A RELATED APPLICATION

The invention described and claimed hereinbelow is also described in German Patent Application DE 102005060861 filed on Dec. 20, 2005. This German Patent Application, whose subject matter is incorporated here by reference, provides the basis for a claim of priority of invention under 35 U.S.C. 119(a)-(d).

BACKGROUND OF THE INVENTION

The present invention generally relates to a force sensor device in a two-wheeled vehicle.

More particularly, the invention relates to a force sensor device, in particular for detecting weight or other forces acting on mechanical components of a two-wheeled vehicle, which, preferably by means of electrical or electromagnetic effects, issues an electrical signal that corresponds to a compressive, tensile, or bending force acting on the force sensor, as generically defined by the main claim.

Many fields of mechanics require force sensors, which, even in relatively inaccessible locations on devices or assemblies or even attachment points of mechanical parts that are subjected to various forces, should permit as precise as possible a determination of the tensile and/or compressive forces at work where they are located.

For example, DE 102 16 723 A1 has disclosed a dynamometer particularly intended for determining seat weight in a motor vehicle in which a bearing body is constructed so that at least one permanent magnet in the bearing body is surrounded by ferromagnetic material in such a way that the exertion of a force on the bearing body results in a distance change between the permanent magnet and the ferromagnetic material. This distance change influences the magnetic field strength in the vicinity of the bearing body, which in turn can be detected by means of a magnetic field-sensitive sensor and evaluated, for example, in a regulating device.

In addition, DE 102 29 021 A1 has disclosed the integration of such a dynamometer directly into the seat suspension for the respective passenger seats in a passenger vehicle. The mechanical connection point between the vehicle chassis and the seats is a focal point for the forces that are exerted by the passengers and are important, for example, for optimum function of vehicle safety systems such as air bags or other restraint systems.

DE 102 23 366 A1 has also disclosed providing the user of a two-wheeled vehicle with pressure-sensitive sensors, switches, or strain gauges, which are mounted in the region of seat surfaces, infant safety seats, or luggage suspension points in the two-wheeled vehicle and determine the load state of the two-wheeled vehicle.

Appropriately adapted forms of the above-mentioned restraint systems are also useful for assuring improved protection of the rider and passenger in two-wheeled vehicles. It is thus necessary in this case as well to detect the load state and possibly also the load positions for an optimally functioning mechanical or electronic triggering. Also in two-wheeled vehicles, it is absolutely crucial to have an optimum control of brake regulating systems, in particular antilock brake systems (ABS). For example, if the front wheel brake is actuated forcefully, this can cause a lifting of the rear wheel depending on the load state so that the rear wheel is no longer as forcefully involved in the braking and there is the risk of flipping forward over the front wheel.

SUMMARY OF THE INVENTION

Accordingly, it is an object of the present invention to provide a force sensor device in a two-wheeled vehicle which is a further improvement of the existing devices.

A force sensor apparatus in accordance with the present invention is advantageously modified for use in a two-wheeled vehicle. In the two-wheeled vehicle, preferably a motor vehicle, a main frame that connects the front and rear wheel is attached to at least one additional frame component provided to accommodate persons and belongings. According to the invention, a bearing body with an integrated force sensor is attached to at least one connection point between the main frame and the at least one additional frame component; the force sensor is able to sense the forces occurring between the main frame and the at least one additional frame component.

This apparatus according to the invention is therefore able to sense the load state of the two-wheeled vehicle in a simple fashion, particularly in order to control the brake regulating system and possibly also restraint systems. As a rule, the seat surfaces for the rider and passenger are self-contained structural units comprised of steel, light alloy, or fiber-reinforced plastics; these units can, for example, be screw-connected in a frictionally engaging fashion to at least two or four points of the main frame.

In a particularly advantageous fashion, the above-described force sensor apparatus has at least one force sensor equipped with a measuring pin provided with a magnet apparatus and a magnetic field-sensitive sensor. Then, through the action of an external force F in the field of a sensor element, regions of the measuring pin can be changed in their position so that an electrical signal can be picked up at the sensor.

By using a measuring pin in lieu of the normal screw-connection, it is thus possible to measure the transmitted force, with the respective adaptation resulting from the mechanical/electrical design of the force sensor. Given the known mechanical geometry of the two-wheeled vehicle, it is then possible, based on the force F, to determine the load on the front wheel $F_V$ and the rear wheel $F_H$.

Preferably, the force sensor apparatus according to the invention is constructed so that in the force sensor, an outer cylindrical part here, which the force F engages via the at least one additional frame component, is situated opposite an inner cylindrical part of the measuring pin connected to the main frame; the sensor element and a permanent magnet are situated inside the force sensor in such a way that with the exertion of a force F, it is possible to detect a distance reduction between the outer and inner part and therefore a change in a magnetic field.

In an advantageous embodiment, the sensor element of the force sensor is comprised of at least one Hall element or Hall IC attached to the inner part, situated in the vicinity of a respective permanent magnet.

A particularly advantageous embodiment of the invention is constructed so that the connection point between the main frame and the additional frame component is comprised of a rocker whose fulcrum is supported in rotary fashion on the main frame by means of a spring shock absorber; both sides of the rocker arm movably supported on the additional frame component by means of mounts that permit the rocking motion, with a force sensor situated on at least one of the lateral mounts.

The rocker can be comprised of a short arm with a rubber mount attaching it to the frame component and a long arm equipped with the force sensor on the mount. The rocker achieves a mechanically stable, uniform spring shock absorption at the main frame of the two-wheeled vehicle. This enables continued use of conventional spring shock absorber types without requiring costly adaptations.

Preferably, the force sensor can be constructed using the above-described force measuring pins and a magnetic field evaluation. Alternatively, however, it is also possible for the force sensor to have at least one strain gauge as a sensor element, which is attached to one arm of the rocker; a so-called strain gauge measuring bridge is comprised of four strain gauges connected together to form a sensor element in order to improve evaluation capacity.

The force sensor apparatus according to the above-described embodiments can also be constructed so that the sensor element is connected to an evaluation unit in the two-wheeled vehicle, which unit can determine the forces acting on the front wheel and the rear wheel, taking into account the geometry of the two-wheeled vehicle. This evaluation unit is then able to determine the load state of the two-wheeled vehicle with regard to persons sitting on it and luggage loaded on it and is also able to determine the absolute forces of the rotation-reluctant and dynamic wheel force distribution and the values determined can be used to act on a brake regulating system and/or a passenger restraint system.

The danger mentioned at the beginning that for example when the front wheel brake is actuated forcefully, depending on the load state, the rear wheel of a two-wheeled vehicle can lift up because the rear wheel is no longer braked as forcefully, can be reduced in a simple fashion by the invention by means of a controlled, short release of the rear wheel brake in order to prevent the lifting of the rear wheel, thus eliminating the danger of the vehicle flipping forward over the front wheel.

The novel features which are considered as characteristic for the present invention as set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
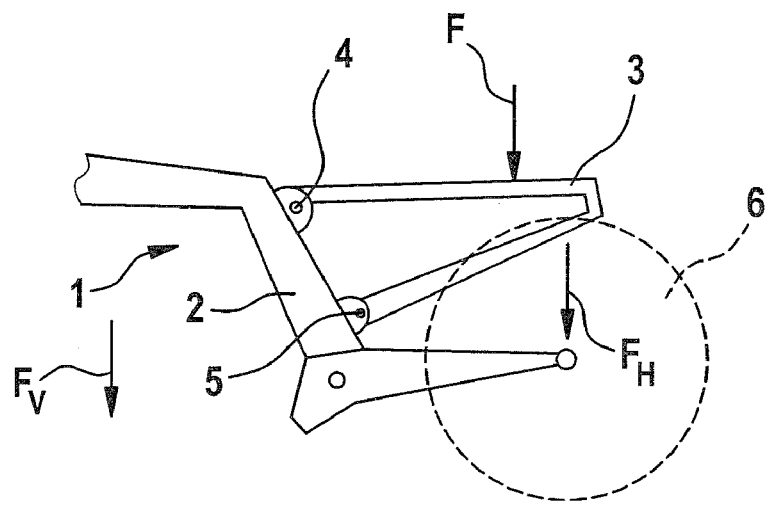
FIG. 1 schematically depicts frame components of a two-wheeled vehicle, with the exertion of force.

FIG. 1 schematically depicts a two-wheeled vehicle 1 with a portion of a main frame 2 to which an additional frame component 3, functioning as a rear frame support for riders or luggage, is attached by means of two connection points 4 and 5. The load state of the two-wheeled vehicle 1 must then be determined here in order to ascertain the effect of the force F on the front wheel, not shown here, as the force $F_V$ and on the rear wheel 6 as the force $F_H$. In FIG. 1, for example, a force sensor is mounted at the connection point 4 and the conventional moving bearing is situated at the connection point 5.

As explained in the introduction to the specification, the determination of the load state makes it possible, for example, to achieve an optimally functioning mechanical or electronic triggering for safety or brake systems.

Figure 2:
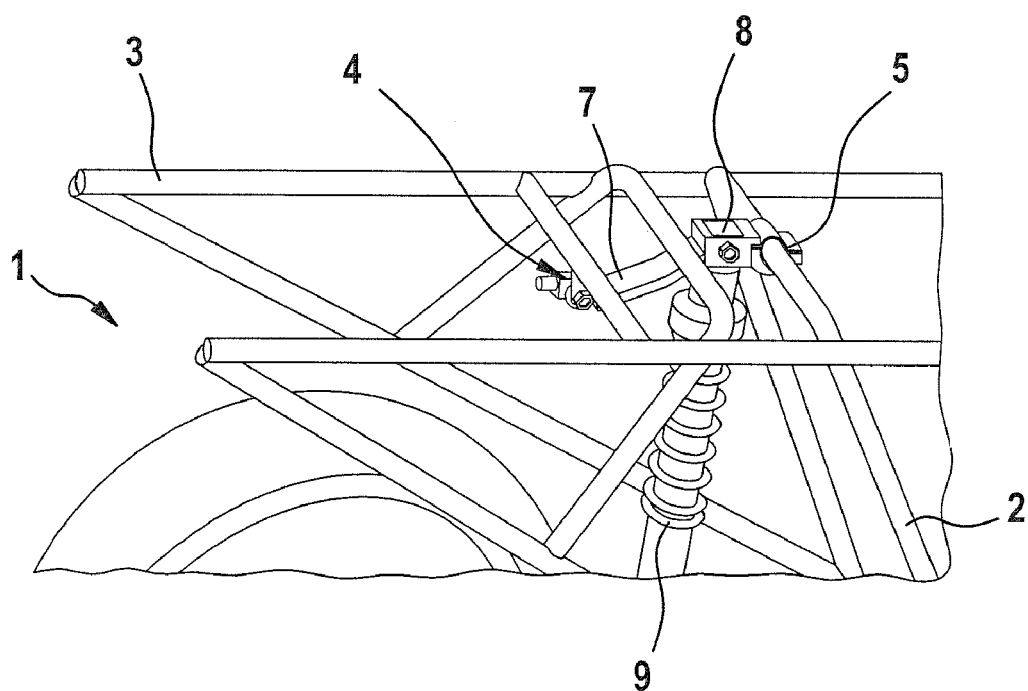
FIG. 2 shows an exemplary embodiment in which a frame component is supported by means of a rocker equipped with a force sensor.

FIG. 2 shows an exemplary embodiment of a connection between the main frame 2 and the frame component 3 in which a rocker 7 is provided, which is secured to the main frame 2 centrally by means of a pivot joint or fulcrum 5 and is secured to the frame component 3 at the connection point 4. A bearing point 8 accommodates a spring shock absorber 9.

In the exemplary embodiment according to FIG. 2 as well, a force sensor can be situated at the connection point 4. In this case, for example, it is possible to use a force sensor or dynamometer 10 known from the prior art patent application DE 102 16 723 A1 mentioned that the beginning, which is described in conjunction with FIG. 3, with reference to the explanations of the prior art in paragraphs 0009 and 0015 and the FIG. 1 described therein.

Figure 3:
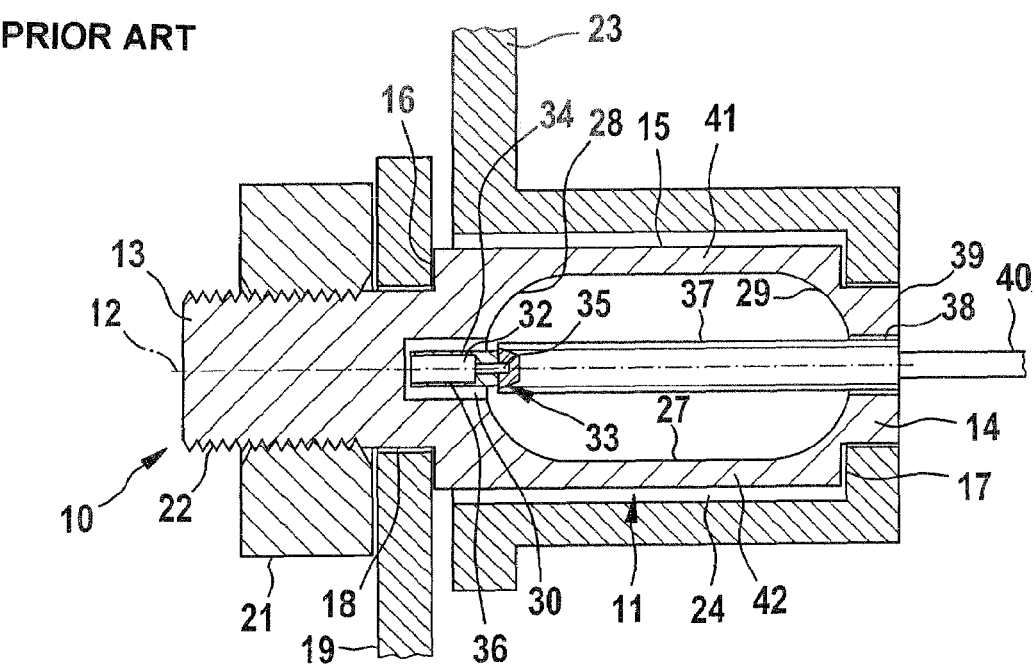
FIG. 3 shows a force sensor according to the prior art.

In summary, the known dynamometer 10 according to FIG. 3 has a ferromagnetic bearing body 11 that is embodied in the form of a rotationally symmetrical component with a longitudinal axis 12. At its opposite ends, the bearing body 11 has respective end sections 13, 14, each with a diameter that is reduced in comparison to that of a middle section 15; between the respective end sections 13, 14 and the middle section 15, a respective collar is formed, which serves as a stop.

In the known apparatus, the end section 13 of the bearing body 11 can be inserted into a hole 18 of a stationary bearing of a seat rail 19 in a vehicle and can be rigidly affixed to the seat rail 19 by means of a nut 21 and a thread 22. A rocker arm 23, which is a component of the motor vehicle seat, not shown, can be slid onto the other end section 14 of the bearing body 11 and attached there. Between the rocker arm 23 and the bearing body 11 there is thus only one connection in the region of the end section 14, while there is always a gap 24 between the rocker arm 23 and the middle section 15 of the bearing body 11. A seat force F to be measured is consequently transmitted via the rocker arm 23 into the end section 14 of the bearing body 11, thus causing the bearing body 11 to deform due to its one-sided support in the rail 19.

The magnitude of the deformation resulting from the force F depends in a known way on the distance between the two bearing points, i.e. the distance between the rail 19 and the bearing collar 25 of the rocker arm 23. In the bearing body 11, a first recess is provided in the form of a through opening 27 situated approximately in the middle section 15. The through opening 27 is produced in particular by means of milling and, in order to prevent notch effects when placed under stress by the force F, has rounded interior walls 28, 29 in the region of the sides oriented toward the end sections 13,14. A second recess in the form of a blind hole bore 30, whose center point extends in the longitudinal axis 12, leads from the base of the inner wall 28 oriented toward the seat rail 19. The bottom of the blind hole bore 30 extends to approximately the middle of the height of the seat rail 19.

At least the permanent magnet 32 of a sensor apparatus 33 protrudes into the blind hole bore 30 with a small radial gap 34. In addition to the permanent magnet 32, the sensor apparatus 33 is also equipped with a magnetic field-sensitive sensor 35 that is preferably embodied in the form of a Hall IC. It is essential for the permanent magnet 32 and the sensor 35 to be situated in stationary fashion in relation to each other on a support 36 and for the pole axis of the permanent magnet 32 to extend in the longitudinal axis 12 of the bearing body 11. The support 36 is fastened to a receptacle 37, which in turn protrudes through the through hole 38 in the end surface 39 of the bearing body 11 and is rigidly coupled to the bearing body 11 there. The embodiment in the form of a receptacle 37 makes it possible to electrically contact the sensor apparatus 33 by means of a cable 40 through the inner wall of the receptacle 37.

In the known embodiment of the bearing body 11, there are thus two connecting struts 41, 42 extending parallel to the longitudinal axis 12 so that upon introduction of the force F, the bearing body 11 deforms in the fashion of a double-bend bar. But the receptacle 37 does not participate in the deformation of the bearing body 11. Rather, the receptacle 37 moves out of its starting position in the longitudinal axis 12, thus changing the size of the radial gap 34 over its circumference in a nonuniform fashion. Because of the change in the radial gap 34, the field strength of the magnetic field lines of the permanent magnet 32 increases in the region of the smaller radial gap 34. The sensor 35 detects this change in the field strength, which an evaluation circuit then converts into a signal for corresponding seat force.

Figure 4:
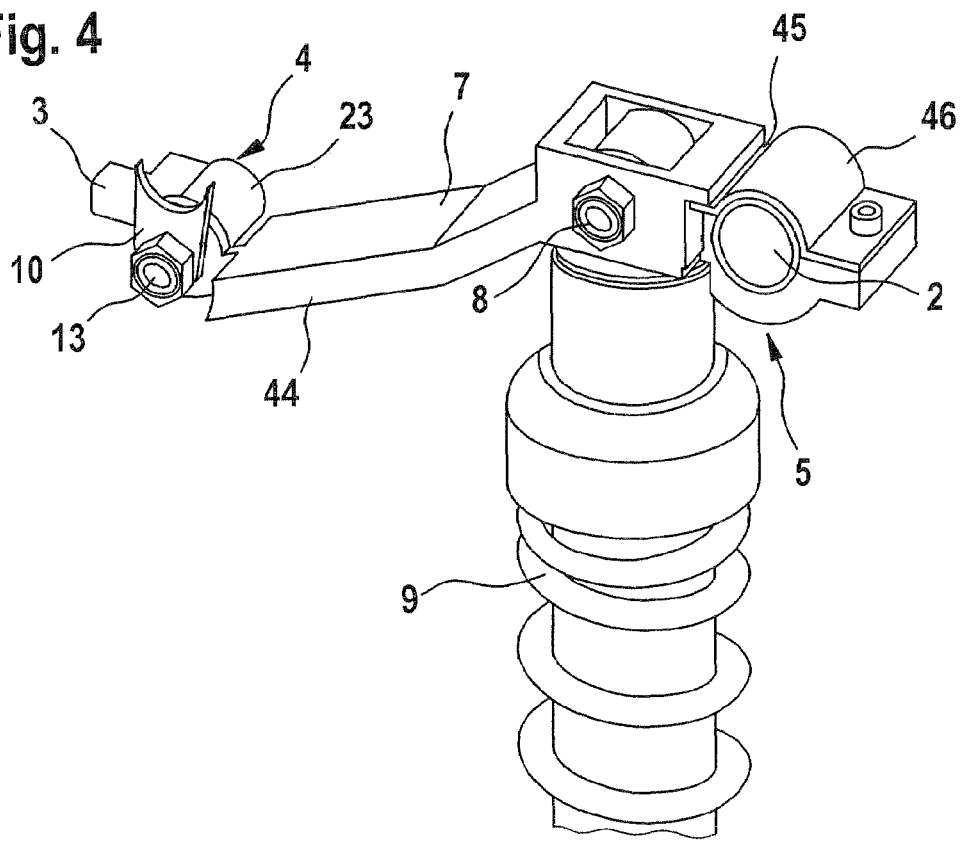
FIG. 4 is a detailed depiction of the rocker according to FIG. 2.

FIG. 4 shows the rocker 7 from FIG. 2, with a detailed depiction of how it is secured via the pivot joint 8 to the spring shock absorber 9 of the 2-wheeled vehicle 1 according to FIG. 2. The rocker 7 here has a long arm 44 and a short arm 45; on the short arm 45, the connection point 5 according to FIG. 2 is implemented in the form of a rubber mount 46 to the frame component 3. On the long arm 44 of the rocker 7, the force sensor 10 described in conjunction with FIG. 3 is attached to the frame component 3 at the connection point. Attaching the bearing body 11 to the rocker 8 as shown in FIG. 3 and attaching the rocker arm 23 to the frame component 3 in the manner described in conjunction with this figure therefore makes it possible to sense the force F that is to be detected.

For example, in the above-described use in a two-wheeled motor vehicle 1, forces of approximately 750 N can act on the force sensor 10 and forces of approximately 1250 N can act on the other connection point 5 in a downward, perpendicular direction so that 2000 N act on the pivot joint in an upward direction.

Figure 5:
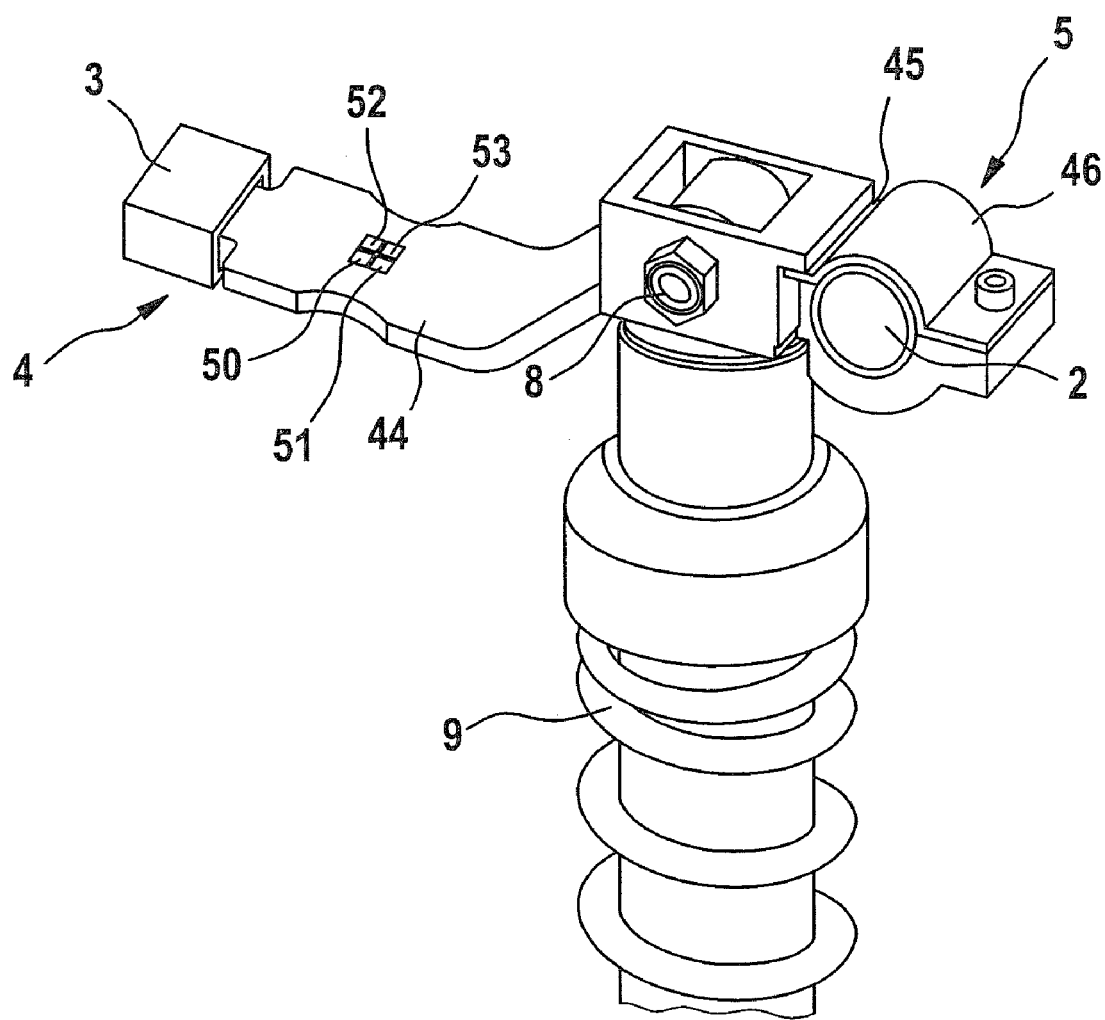
FIG. 5 shows an alternative exemplary embodiment of a force sensor equipped with a strain gauge measuring bridge mounted on a rocker that is similar to the exemplary embodiment according to FIG. 2.

An alternative exemplary embodiment according to FIG. 5 shows a different form of force sensing that is constructed using conventional, known strain gauges 50, 51, 52, 53. On the long arm 44 of the rocker 7, these strain gauges 50, 51, 52, 53 are connected to form a measuring bridge so that with a deflection of the arm 44, it is possible to detect the force acting on the connection point 4 using known measurement methods in the same way as in the above-described exemplary embodiment.

It will be understood that each of the elements described above, or two or more together, may also find a useful application in other types of constructions differing from the type described above.

While the invention has been illustrated and described as embodied in a force sensor device in a two-wheeled vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A force sensor apparatus in a two-wheeled vehicle in which a main frame that connects a front wheel to a rear wheel is attached to at least one additional frame component for accommodating persons and belongings, the force sensor apparatus comprising a bearing body with an integrated force sensor attachable at least in a region of a connecting point between the main frame and the at least one additional frame component and sensing forces that occur between the main frame and the at least one additional frame component, wherein for the two-wheeled vehicle in which the connection point between the main frame and the additional frame component includes a rocker whose pivot point is supported in pivoting fashion on the main frame by a spring shock absorber and both arms of said rocker are supported at said pivot point in a moving fashion on the additional frame component by mounts that permit a rocking motion, said integrated force sensor is situated on at least one of lateral mounts at the connection point.

2. A force sensor apparatus as defined in claim 1, wherein said at least one force sensor has a measuring pin provided with a magnet apparatus and has a magnetic field-sensitive sensor, and configured so that upon exertion of an external force in a field of a sensor element, regions of a measuring pin are changed in their position so that an electrical signal is picked up at said sensor.

3. A force sensor apparatus as defined in claim 2, wherein said force sensor is configured so that in it, an outer cylindrical part that a force engages via the at least one additional frame component is situated opposite an inner cylindrical part of said measuring pin connected to the main frame and said sensor element and a permanent magnet are situated inside said force sensor in such a way that with the exertion of the external force a distance change between said outer part and said inner part and therefore a change in a magnetic field is detectable.

4. A force sensor apparatus as defined in claim 3, wherein said sensor element includes at least one member selected from the group consisting of a Hall element and a Hall IC, mounted to said inner part adjacent to said permanent magnet.

5. A force sensor apparatus as defined in claim 1, wherein the rocker has a short arm equipped with a rubber mount to the frame and a long arm equipped with said force sensor in a region of the mount.

6. A force sensor apparatus as defined in claim 1, wherein said force sensor has at least one strain gauge as a sensor element, which is situated on one arm of the rocker.

7. A force sensor apparatus as defined in claim 6; and further comprising a measuring bridge including at four said strain gauges which are connected together to form said sensor element.

8. A force sensor apparatus as defined in claim 1; and further comprising an evaluation unit arrangeable on the two-wheeled vehicle, said sensor element being connected with said evaluation unit, said evaluation unit determining forces exerted on the front wheel and rear wheel by taking into account a geometry of the two-wheeled vehicle.

9. A force sensor apparatus as defined in claim 8, wherein said evaluation unit is configured so as to determine a load state of the two-wheeled vehicle with respect to persons sitting on it and luggage loaded on it and also to determine absolute forces of rotation-reluctant and dynamic wheel force distribution, and to act on a system selected from the group consisting of a brake regulating system, a passenger restraint system, and both.

* * * * *